United States Patent Office ──

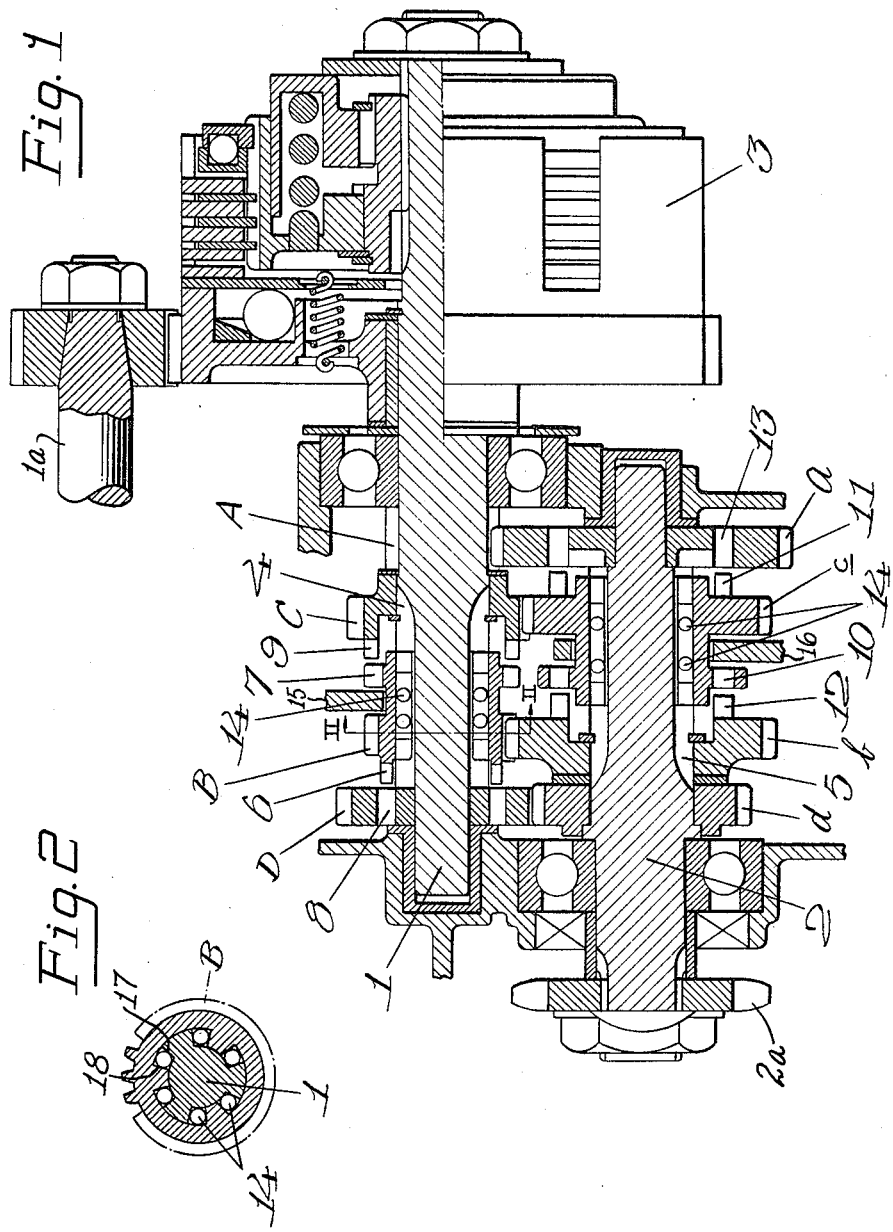
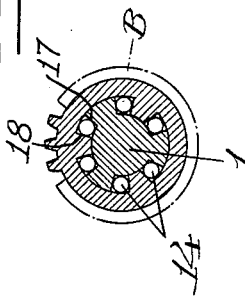

3,285,088
Patented Nov. 15, 1966

3,285,088
MULTI-STAGE SPEED CHANGE GEAR
Kunio Atsumi and Minoru Ishida, Hamamatsu-shi, Japan, assignors to Suzuki Motor Co., Ltd., Shizuoka-ken, Japan, a corporation of Japan
Filed Sept. 24, 1963, Ser. No. 311,115
Claims priority, application Japan, Oct. 8, 1962, 37/44,496
3 Claims. (Cl. 74—359)

This invention relates to a four speed change gear for changing speed ratio between a driving shaft and a driven shaft. The invention particularly relates to a multi-stage speed change gear wherein the four respective gears supported by the driving shaft and the driven shaft are in continuous meshing engagement with each other and provide four different speed ratios.

The transmission comprises one gear splined to the driving shaft and another gear splined to the driven shaft. Each of the splined gears is axially movable from a neutral position to either of two driving positions wherein it engages a gear which is freely revoluble on the same shaft. In one driving position, the splined gear laterally engages a gear continuously meshing with the other splined gear and in the other driving position the splined gear laterally engages a freely revoluble gear in continuous meshing engagement with another gear fast on the other shaft.

In this manner two splined gears, each on one of the two shafts, provide four speed ratios each of which may be selected by displacing one of the splined gears in either of two directions from its neutral position. Each splined gear operates as a positive engagement clutch member when displaced from its neutral position. When both splined gears are in their neutral positions, the transmission is in neutral. Anti-friction balls are provided for facilitating axial displacement of the splined gears under load.

The invention will be described in greater detail in the following specification with reference to the accompanying drawing forming a part hereof.

In the drawing:
FIG. 1 is an elevational view in axial section of an embodiment of the invention.
FIG. 2 is a transverse cross section on line II—II of FIG. 1.

Referring to the drawings, 1 denotes a driving shaft, 2 a follower or driven shaft, 3 a centrifugal clutch provided between the driving shaft 1 and the power shaft 1a (a crankshaft of a prime mover of a vehicle). A sprocket wheel 2a is mounted on shaft 2 for the chain drive of a motorcycle or similar wheel (not shown). A, B, C, D are the driving gear wheels mounted on the driving shaft 1, a, b, c, d are the follower gear wheels mounted on the cooperating shaft 2 and continuously meshing each with one of the driving gear wheels A, B, C, D, respectively. The torque from the driving shaft 1 is transmitted to the following shaft 2 selectively by the gear wheels, Aa, Bb, Cc, and Dd in pairs with one of the splined gears B or c operating as a clutch.

Aa in a pair forms the first acceleration stage, and Bb the second acceleration stage, Cc the third acceleration stage, and Dd the fourth acceleration stage in this order. The gear wheel A is fast or fixed on the driving shaft 1 rigidly, while the gear wheel a is freely revolubly mounted on the follower or driven shaft 2. Now, when the gear wheel a is rotated with the follower shaft 2, the driving shaft 1 drives the follower shaft 2 during the first acceleration stage. The gear wheel D is mounted on the driving shaft 1 freely rotatably and the gear wheel d is fixed rigidly on the follower shaft 2. When the gear wheel D is rotated with the driving shaft 1, the driving shaft 1 drives the follower shaft 2 during the fourth acceleration stage. The gear wheel B is splined on the driving shaft 1, while the gear wheel b is mounted on the follower shaft 2 freely rotatably. When the gear wheel b is rotated with the follower shaft 2, the driving shaft 1 drives the follower shaft 2 during the second acceleration stage. The gear wheel c is splined on the follower shaft 2, while the gear wheel C is mounted on the driving shaft 1 freely rotatably. When the gear wheel C is rotated with the driving shaft 1, said driving shaft 1 drives the follower shaft 2 during the third acceleration stage. The gear wheel B has lugs 6, 7 projecting from opposite sides, and these lugs, by selective sliding of the splined gear B to the right or left by fork 15 engage with the holes 8 of gear D or the lugs 9 provided on the gear wheel D opposite the lugs 6, 7, whereby the torque of the driving shaft 1 is selectively transmitted to the follower shaft 2 through the pair of wheels Dd or Cc, while only the gear wheel B in engagement with the freely rotating gear wheel b moves in the axial direction.

Similarly, the gear wheel c is provided at opposite sides with holes 10 and lugs 11. By selective sliding motion of the splined gear wheel c to the left or right side by fork 16, the holes 10 engage with the lugs 12 or lugs 11 with the holes 13, the lugs 12 being provided on the gear wheel b and the holes 13 in the gear wheel a. When the gear wheel b or a is rotated along with the follower shaft 2 by gear c, torque from the driving shaft 1 is selectively transmitted to the follower shaft 2 through the acceleration stages Aa or Bb. When gear C or D is driven by shaft 1 through splined gear B, torque is transmitted through gears Cc or Dd. In the drawing, the splined gear wheels B, c are both shown in their neutral positions, wherein the driving shaft and the follower shaft are not in driving connection.

In the drawing 14, 14 denote anti-friction balls interposed between the flat radial faces 17 of the spline fittings 4, 5 and confronting radial faces 18 in the hubs of the splined gears B and c, whereby the sliding friction of the gear wheels B, c while sliding in axial direction is converted into the rolling friction reducing the sliding resistance to a large extent. Particularly when the driving shaft 1 is transmitting torque to the follower shaft 2, said shafts and one of the gear wheels B or c is pressed against the spline fittings rigidly in the circumferential direction, but the interposition of balls 14 lessen the force required for axial displacement of the gear wheel B or c.

One of the features of the invention is to be able to shift either splined gear wheel very easily in the axial direction when under load by virtue of the interposed balls or rollers. It is not necessary to open the clutch 3 when changing speed.

As shown in FIG. 1, where the driving shaft is rotated by the prime mover and the driven shaft by wheel of a vehicle, there is a difference between angular velocities of the gear wheel B rotating with the driving shaft 1 and the gear wheels C, D rotated by gears c, d on the follower shaft. Similarly, there is a difference between the angular velocities of the splined gear wheel c, and the gears a, b. As the differences in angular velocities are relatively small, it is possible to shift gears rapidly and smoothly under load.

Advantageously, the clutch 3 may be of the cushioned torque-limiting centrifugal type as disclosed, for example, in the allowed copending application of Kunio Atsumi and Hiroshi Wada, Serial No. 361,140 filed April 20, 1964 and assigned to the same assignee as this application.

What is claimed is:
1. A change speed transmission, comprising: a driving shaft and a driven shaft fixedly spaced from and parallel to said driving shaft; a first pair of continuously meshing gears, one gear of said first pair being fast on said driving shaft and the other gear of said first pair being freely revoluble on said driven shaft; a second pair of continuously meshing gears, one gear of said second pair being freely revoluble on said driving shaft and the other gear of said second pair being fast on said driven shaft; a third pair of continuously meshing gears, one gear of said third pair being splined on said driving shaft, the other gear of said third pair being freely revoluble on said driven shaft; a fourth pair of continuously meshing gears, one gear of said fourth pair being freely revoluble on said driving shaft and the other gear of said fourth pair being splined to said driven shaft; said four pairs of gears providing four different speed ratios between the gears on said driving shaft and the gears on said driven shaft; first fork means for selectively shifting the splined one of said third pair of gears axially from a neutral position into lateral driving engagement either with said one gear of said second pair or said one gear of said fourth pair; and second fork means for selectively shifting the splined one of said fourth pair of gears axially from a neutral position into lateral driving engagement either with the other gear of said first pair or the other gear of said third pair, said driving shaft being drivingly disconnected from said driven shaft when both of said splined gears are in their neutral positions, each of said four speed ratios being obtainable between said driving and driven shafts by separate axial displacement of a single one of said splined gears in one direction or the other from its neutral position.

2. A transmission according to claim 1, further comprising anti-friction means included in the splined connections of said splined gears to their respective shafts.

3. A transmission according to claim 2, wherein said anti-friction means comprises a plurality of balls in rolling engagement between angularly spaced flat confronting surfaces, one of said confronting surfaces being formed on one of said shafts, the other surface being formed on the hub portion of one of said gears.

References Cited by the Examiner
UNITED STATES PATENTS

| | | | |
|---|---|---|---|
| 851,728 | 4/1907 | Bayrer | 64—23.7 |
| 1,353,461 | 9/1920 | Dominicus | 74—359 |
| 2,608,878 | 9/1952 | Warsaw | 74—333 |
| 2,952,145 | 9/1960 | Thompson | 64—23.7 |

DAVID J. WILLIAMOWSKY, *Primary Examiner.*

H. S. LAYTON, *Assistant Examiner.*